(12) United States Patent
Sze et al.

(10) Patent No.: US 7,458,761 B2
(45) Date of Patent: Dec. 2, 2008

(54) APPARATUS AND METHOD FOR FLIPPING ELECTRONIC COMPONENTS

(75) Inventors: Chak Tong Albert Sze, Hong Kong (CN); Pei Wei Tsai, Hong Kong (CN); Hiu Fai Ho, Hong Kong (CN)

(73) Assignee: ASM Assembly Automation Ltd., Hong Kong (HK)

( * ) Notice: Subject to any disclaimer, the term of this patent is extended or adjusted under 35 U.S.C. 154(b) by 483 days.

(21) Appl. No.: 11/232,645

(22) Filed: Sep. 22, 2005

(65) Prior Publication Data

US 2006/0070849 A1    Apr. 6, 2006

Related U.S. Application Data

(60) Provisional application No. 60/612,762, filed on Sep. 24, 2004.

(51) Int. Cl.
*B65G 47/24* (2006.01)
*B25J 1/00* (2006.01)

(52) U.S. Cl. ............... 414/764; 414/758; 414/765; 198/402; 198/403

(58) Field of Classification Search ........... 198/402, 198/403, 407, 412; 414/758, 764, 765
See application file for complete search history.

(56) References Cited

U.S. PATENT DOCUMENTS

| | | | | |
|---|---|---|---|---|
| 2,865,516 A | * | 12/1958 | Hedderich | 414/765 |
| 4,523,670 A | * | 6/1985 | Yanagisawa et al. | 198/403 |
| 4,573,863 A | * | 3/1986 | Picotte | 414/763 |
| 4,770,566 A | * | 9/1988 | Okada et al. | 406/151 |
| 4,798,278 A | * | 1/1989 | Cornacchia | 198/399 |
| 5,044,872 A | * | 9/1991 | Hunt et al. | 414/816 |
| 5,395,207 A | * | 3/1995 | Hoffman | 414/798.4 |
| 5,836,438 A | * | 11/1998 | Jung | 198/402 |
| 5,971,695 A | * | 10/1999 | Batzer et al. | 414/765 |
| 6,000,902 A | * | 12/1999 | Mueller et al. | 414/758 |
| 6,139,243 A | * | 10/2000 | Jackson et al. | 414/405 |
| 6,190,111 B1 | * | 2/2001 | Nuhlicek et al. | 414/405 |
| 6,398,008 B1 | * | 6/2002 | Suga | 198/404 |
| 6,595,309 B1 | * | 7/2003 | Savage et al. | 180/190 |
| 7,175,017 B2 | * | 2/2007 | Carey et al. | 198/412 |

* cited by examiner

*Primary Examiner*—Douglas A Hess
(74) *Attorney, Agent, or Firm*—Ostrolenk, Faber, Gerb & Soffen, LLP

(57) ABSTRACT

An apparatus and method is provided for flipping electronic components in the sense of changing their orientation, such as for changing the orientation of electronic components between 'live bug' and 'dead bug' orientations. The apparatus comprises a rotary device that is configured to receive the electronic component and a force actuator operative to bias the electronic component into engagement with the rotary device. A driving mechanism coupled to the rotary device is operative to rotate said rotary device for changing the orientation of the electronic component, after which an ejector is used to eject the electronic component from the rotary device after changing the orientation of the electronic component.

17 Claims, 3 Drawing Sheets

APPARATUS AND METHOD FOR FLIPPING ELECTRONIC COMPONENTS

Cross Reference To Applications

This application claims the benefit of the U. S. Provisional Patent Application No. 60/612,762 filed on 24 Sep. 2004, the disclosure of which is hereby incoporated by reference.

FIELD OF THE INVENTION

The invention relates to the automated handling of electronic components such as semiconductor devices, and in particular, to changing an orientation of an electronic component.

BACKGROUND AND PRIOR ART

In the manufacture of electronic components such as molded semiconductor devices, after the electronic components have been encapsulated and singulated, they have to go through other processes such as testing, inspection and final packing of the electronic components into tubes, trays or in tape and reel format. Some of these processes are preferably performed when the component is in a 'live bug' orientation (with the pins of the semiconductor device facing down) while others are preferably performed when the component is in a 'dead bug' orientation (with the pins of the semiconductor device facing up). Therefore, when transferring the component from one process to another process, there may be a need for an intermediate process to turn the component to a 'live bug' or to a 'dead bug' orientation by flipping the component. This is usually not a problem if the processes are carried out in standalone machines, in which case the electronic components will simply be fed into the respective machine in either a 'live bug' or a 'dead bug' configuration.

However, in a demanding and competitive semiconductor industry, efforts are continually being made to integrate and automate multiple semiconductor backend processes such as final test, inspection and packing within a single system. Such integrated systems typically include a rotary turret based handling system, which is widely used in the semiconductor industry. Rotary turret based handling systems are highly efficient, flexible and are capable of operating at high speeds. The system has numerous individual high-speed turret pick heads and it provides a means for integrating a variety of test, inspection, packing and other processing operations on individual stations around the periphery of the rotary turret platform. The sequence of the stations can be flexibly configured to meet the process requirements of different package types. In some cases, a smaller auxiliary rotary table may be interfaced with a specific mainstream turret station for the transfer of devices to the auxiliary table for testing or some other operations before returning the device to the mainstream turret for further processing. In general, these systems depend on a central, highly accurate, direct-drive indexing actuator to move devices sequentially to various stations on the platform.

It is therefore desirable to have an apparatus or device that may be flexibly configured at any station adjacent to the rotary turret system to flip an electronic component. The function of the device or module would be to receive an electronic component from an upstream process via a turret pick head, move the electronic component to a flipping mechanism, flip the electronic component and then return the electronic component to a pick-up position to be picked by the turret pick head and moved to a downstream station for further processing.

SUMMARY OF THE INVENTION

It is therefore an object of the present invention to seek to provide an apparatus and method for changing the orientation of electronic components in a relatively simple yet effective way.

According to a first aspect of the invention, there is provided an apparatus for changing an orientation of an electronic component, comprising: a rotary device that is configured to receive the electronic component; a force actuator operative to bias the electronic component into engagement with the rotary device; a driving mechanism coupled to the rotary device that is operative to rotate said rotary device for changing the orientation of the electronic component; and an ejector for ejecting the electronic component from the rotary device after changing the orientation of the electronic component.

According to a second aspect of the invention, there is provided a method for changing an orientation of an electronic component, comprising the steps of: biasing the electronic component into engagement with a rotary device with a force actuator; rotating the rotary device with a driving mechanism coupled to the rotary device to change the orientation of the electronic component; and thereafter ejecting the electronic component from said rotary device.

It will be convenient to hereinafter describe the invention in greater detail by reference to the accompanying drawings which illustrate one embodiment of the invention. The particularity of the drawings and the related description is not to be understood as superseding the generality of the broad identification of the invention as defined by the claims.

BRIEF DESCRIPTION OF THE DRAWING

An example of a preferred embodiment of the flipping apparatus and method in accordance with the invention will now be described with reference to the accompanying drawings, in which.

DETAILED DESCRIPTION OF THE PREFERRED EMBODIMENT

The preferred embodiment of the present invention is configured to flip an electronic component. "Flipping" here refers to turning the electronic component to change its orientation, for example, to change it from a 'live bug' orientation to a 'dead bug' orientation or vice versa. The apparatus and method seek to provide a simple but high-speed station for receiving an electronic component from another location, flipping the electronic component to change its orientation and then returning the device to its original position with the correct orientation.

Figure 1:
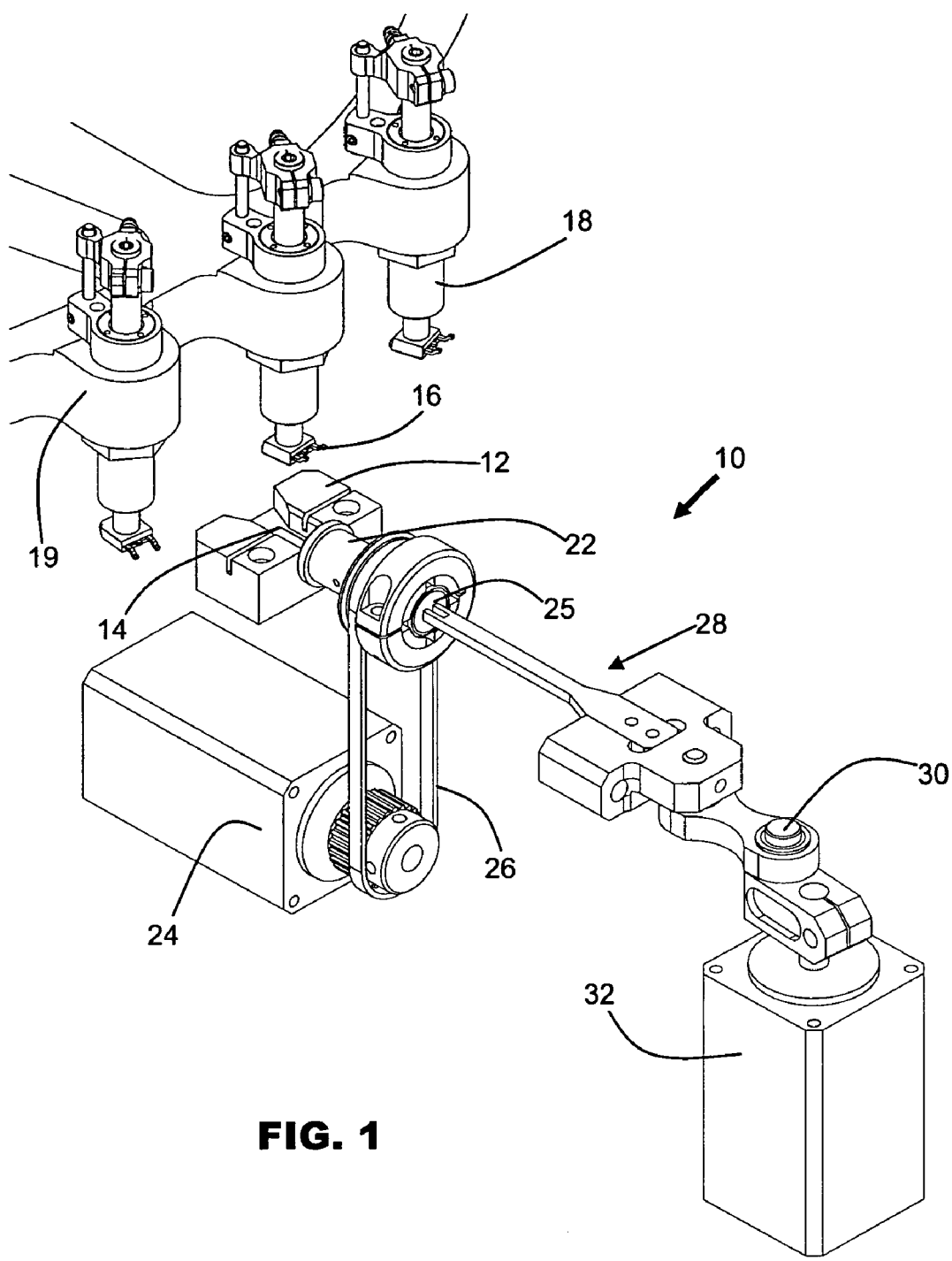
FIG. 1 is an isometric view of some of the primary components of an apparatus for flipping electronic components according to the preferred embodiment of the invention.

FIG. 1 is an isometric view of some of the primary components of the apparatus 10 for flipping electronic components, such as semiconductor packages 16, according to the preferred embodiment of the invention. The apparatus 10 includes a support platform such as package support 12 for receiving and supporting a semiconductor package 16 from a conveying device. Typically, the conveying device is a pick head 18 of a rotary turret system (19) that utilizes vacuum suction to hold the semiconductor package 16. The pick head 16 is configured to move between a supply of electronic components (not shown) and the package support 12. Semiconductor packages 16 picked up by the pick head 18 are held by the pick head 18 while the turret system 19 is rotated to bring the semiconductor packages 16 towards the package support 12.

Positioned at a close distance to and substantially level with the package support 12 is a rotary device such as a flipper 22. The package support 12 is first aligned with the rotary turret system 19 during set-up. When a package 16 is brought over to the package support 12 by the pick head 18, the package 16 is first held directly above the package support 12. After the pick head 18 indexes downward such that the package is positioned at a close distance to the package support 12, its vacuum suction is deactivated and instead replaced with an ejection of compressed air. This will cause the package 16 to be released and it will be supported on a track 14 of the package support 12. The track 14 helps to support the package 16 and is aligned with the flipper 22 for guiding motion of the package 16 from the package support 12 to the flipper 22. At the same time, vacuum suction at the base of the package support 12 is activated to hold onto the package 16 firmly.

Figure 2:
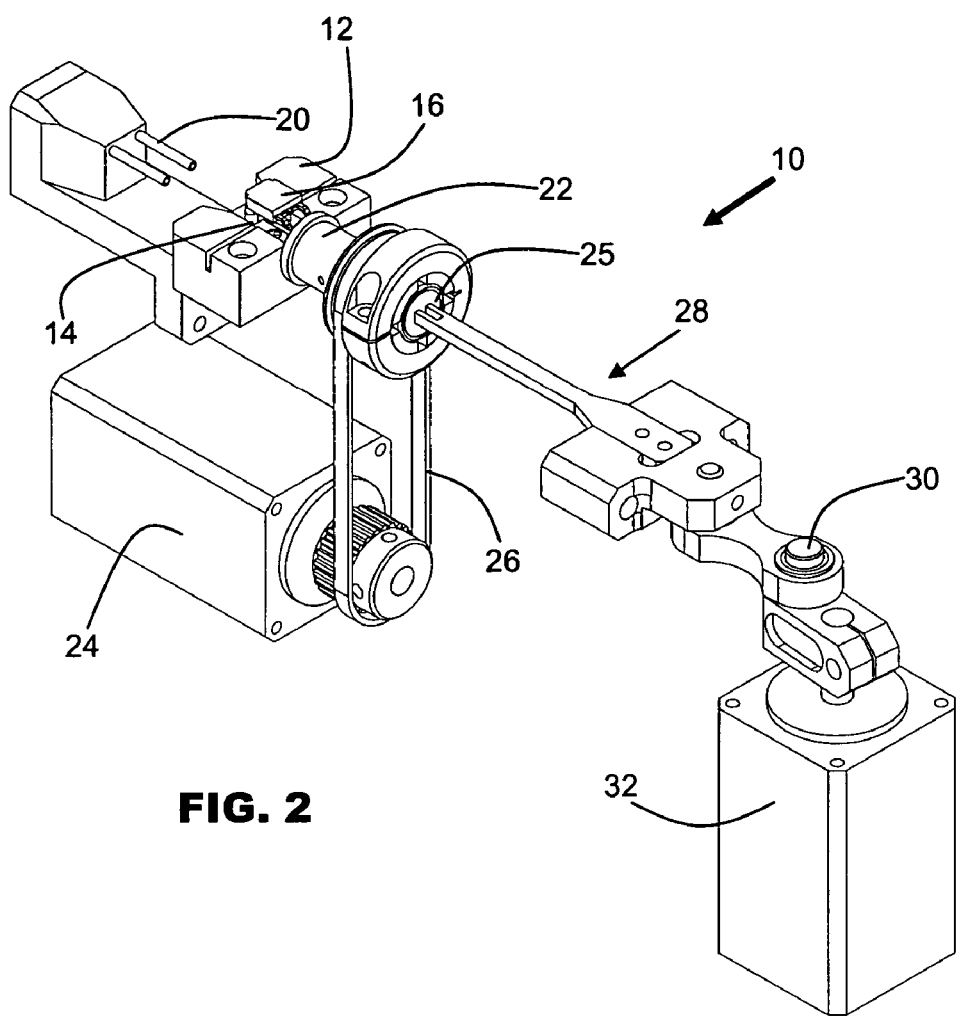
FIG. 2 is an isometric view of the apparatus in FIG. 1 including a force actuator in the form of an air nozzle.

FIG. 2 is an isometric view of the apparatus 10 in FIG. 1 including a force actuator in the form of an air nozzle 20. The air nozzle 20 is located on a side of the package support 12 opposite to the flipper 22 and is operative to bias the package 16 towards the flipper 22 so that it comes into engagement with the flipper 22. The air nozzle 20 is used for directing pressurized air onto the package 16.

Figure 3:
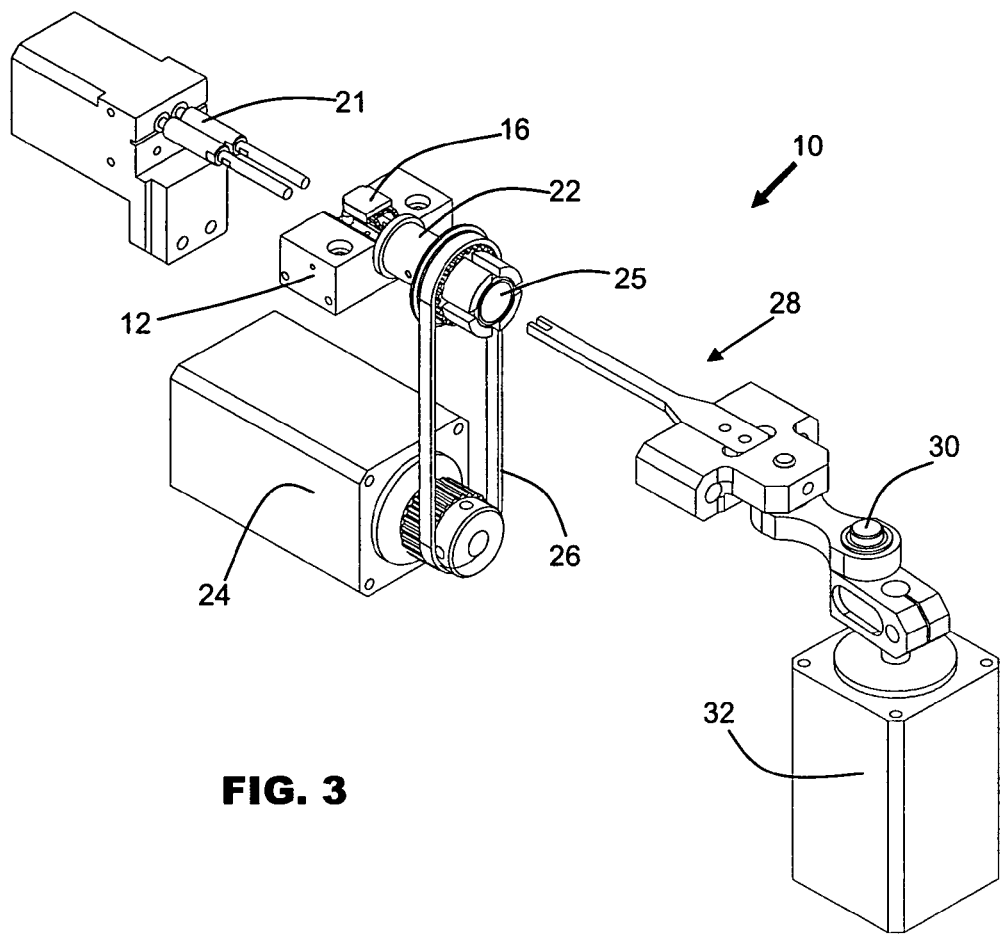
FIG. 3 is an isometric view of the apparatus in FIG. 1 including a force actuator in the form of a piston assembly.

Alternatively, the force actuator may be in the form of a piston assembly 21 comprising one or more piston rods that contact and push the package 16 towards the flipper 22. FIG. 3 is an isometric view of the apparatus 10 in FIG. 1 including a force actuator in the form of a piston assembly 21.

Once the electronic component is placed on the track 14 of the package support 12, the force actuator will be activated to force the package 16 along the package support 12 into engagement with the flipper 22. For example, in case an air nozzle 20 is used, pressurized air is directed at the package 16 in the direction of the flipper 22. When a piston assembly is used, a piston rod is extended to push the package 16 into engagement with the flipper 22. Inside the recess 23 of the flipper 22, there could be two stoppers (not shown), one on each side wall of the flipper to prevent the package from moving beyond the stoppers. This is especially useful in the case when pressurized air is used as there is no means to control how far the package will move.

Figure 4:
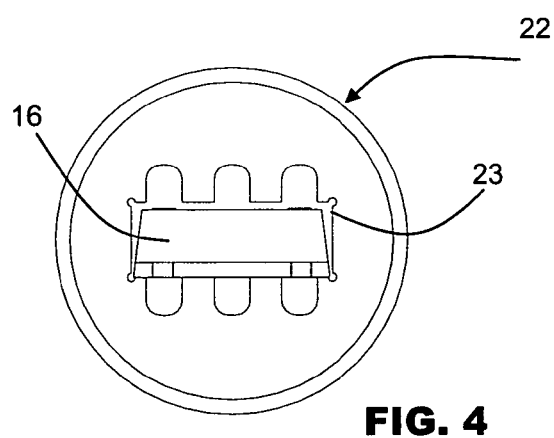
FIG. 4 is a side view of a flipper including a recess adapted to receive an electronic component for flipping.

FIG. 4 is a side view of a flipper 22 including a recess 23 adapted to receive an electronic component for flipping. The recess 23 is preferably shaped for receiving the semiconductor package 16 in a predetermined orientation, and the mechanism is adapted such that the package 16 may be slid into the recess 23 for engagement with the flipper 22.

The flipper 22 is preferably driven to rotate by a driving mechanism coupled to the flipper 22. The driving mechanism preferably comprises a pulley mechanism including a pulley belt 26 that is driven by a pulley motor 24. Once the package 16 is inside the recess 23 of the flipper 22, the pulley motor 24 will drive the pulley belt 26, which will turn the cylindrical flipper 22 by the required angle, such as an angle of 180 degrees. This will in effect flip the package 16 by a corresponding 180 degrees to change its orientation between a 'live bug' and a 'dead bug' orientation.

After the flipping process, the next step is to remove the flipped package 16 from the recess of the flipper 22 and return it to the package support 12. This may be done by activating an ejector 28. In the preferred embodiment of the invention, the ejector 28 and package support 12 are located on opposite sides of the flipper 22. The ejector 28 is drivable by a rotary motor 32 through the use of mechanical linkages 30. The rotary motor 32 will drive and move the linkages 30 such that the ejector 28 is driven towards the flipper 22. Other kinds of motors can be used to drive the ejector 28.

There may be an opening 25 in the flipper 22 that is shaped to allow insertion of the ejector 28 into the said recess 23 of the flipper 22. In this way, the ejector 28 is operable to contact and eject the package 16 out from the recess 23 of the flipper 22. The package 16 will be moved back onto the track 14 of the package support 12. From this position, compressed air at the base of the package support is activated instead of the vacuum suction, and the package is pushed toward the direction of the turret pick head 18. At the same time the vacuum suction is again activated at the turret pick head 18, which will allow it to hold onto the flipped package 16 that has been raised from the package support 12. The package 16 can now be conveyed to a downstream process.

The invention described herein is susceptible to variations, modifications and/or additions other than those specifically described and it is to be understood that the invention includes all such variations, modifications and/or additions which fall within the spirit and scope of the above description.

The invention claimed is:

1. An apparatus for changing an orientation of an electronic component, comprising:
   a rotary device that is configured to receive the electronic component;
   a force actuator operative to bias the electronic component into engagement with the rotary device;
   a driving mechanism coupled to the rotary device that is operative to rotate said rotary device for changing the orientation of the electronic component;
   an ejector for ejecting the electronic component from the rotary device after changing the orientation of the electronic component; and
   a support platform for supporting an electronic component such that the force actuator is operable to bias the electronic component from the support platform towards the rotary device,
   wherein the ejector and the support platform are located on opposite sides of the rotary device.

2. The apparatus as claimed in claim 1, wherein the support platform is arranged to be level with the rotary device.

3. The apparatus as claimed in claim 2, wherein the support platform further comprises a track aligned with the rotary device for guiding motion of the electronic component from the support platform to the rotary device.

4. The apparatus as claimed in claim 1, including a conveying device that is configured to move between a supply of electronic components and the support platform for supplying electronic components to the support platform.

5. The apparatus as claimed in claim 1, wherein the force actuator comprises an air nozzle.

6. The apparatus as claimed in claim 1, wherein the force actuator comprises a piston assembly.

7. An apparatus for changing an orientation of an electronic component, comprising:
   a rotary device that is configured to receive the electronic component;
   a force actuator operative to bias the electronic component into engagement with the rotary device;

a driving mechanism coupled to the rotary device that is operative to rotate said rotary device for changing the orientation of the electronic component;

an ejector for ejecting the electronic component from the rotary device after changing the orientation of the electronic component;

a recess in the rotary device that is shaped for receiving an electronic component in a predetermined orientation; and an opening in the rotary device that is shaped to allow insertion of the ejector to contact and push an electronic component from the rotary device.

8. The apparatus as claimed in claim 1, wherein the rotary device is driven to rotate each electronic device by an angle of 180 degrees.

9. The apparatus as claimed in claim 1, including a pulley mechanism operatively coupled to the rotary device for driving rotation of the rotary device.

10. A method for changing an orientation of an electronic component, comprising the steps of:

biasing the electronic component into engagement with a rotary device with a force actuator;

rotating the rotary device with a driving mechanism coupled to the rotary device to change the orientation of the electronic component; and thereafter ejecting the electronic component from said rotary device; and providing electronic components from a supply of electronic components to a support platform prior to biasing each electronic component into engagement with the rotary device, wherein the ejector and the support platform are located on opposite sides of the rotary device.

11. The method as claimed in claim 10, wherein the force actuator comprises an air nozzle.

12. The method as claimed in claim 10, wherein the force actuator comprises a piston assembly.

13. The method as claimed in claim 10, wherein the step of rotating the rotary device comprises the step of rotating each electronic device by an angle of 180 degrees.

14. The method as claimed in claim 10, wherein the electronic component is a semiconductor package.

15. An apparatus for changing an orientation of an electronic component, comprising:

a support platform for supporting the electronic component;

a rotary device that is configured to receive the electronic component;

a force actuator operative to bias the electronic component from the support platform towards the rotary device into engagement with the rotary device;

a driving mechanism coupled to the rotary device that is operative to rotate said rotary device for changing the orientation of the electronic component; and an ejector for ejecting the electronic component from the rotary device after changing the orientation of the electronic component, wherein the ejector and the support platform are located on opposite sides of the rotary device.

16. An apparatus for changing an orientation of an electronic component, comprising:

a rotary device having a recess that is shaped to receive the electronic component in a predetermined orientation;

a force actuator operative to bias the electronic component into engagement with the rotary device;

a driving mechanism coupled to the rotary device that is operative to rotate said rotary device for changing the orientation of the electronic component; and an ejector for ejecting the electronic component from the rotary device after changing the orientation of the electronic component, wherein the rotary device includes an opening that is shaped to allow insertion of the ejector to contact and push the electronic component from the rotary device.

17. A method for changing an orientation of an electronic component, comprising the steps of:

providing electronic components from a supply of electronic components to a support platform;

biasing the electronic component into engagement with a rotary device with a force actuator;

rotating the rotary device with a driving mechanism coupled to the rotary device to change the orientation of the electronic component; and thereafter ejecting the electronic component from said rotary device, wherein the ejector and the support platform are located on opposite sides of the rotary device.

* * * * *